US010013281B2

(12) United States Patent
Fries (10) Patent No.: US 10,013,281 B2
(45) Date of Patent: Jul. 3, 2018

(54) CONTROLLING NETWORK UTILIZATION

(75) Inventor: Robert Fries, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 13/171,445

(22) Filed: Jun. 29, 2011

(65) Prior Publication Data

US 2013/0007254 A1    Jan. 3, 2013

(51) Int. Cl.
  *G06F 9/48* (2006.01)
  *G06F 9/455* (2018.01)
  *G06F 11/34* (2006.01)
  *H04L 12/26* (2006.01)

(52) U.S. Cl.
  CPC ........ *G06F 9/4856* (2013.01); *G06F 9/45558* (2013.01); *G06F 11/3433* (2013.01); *G06F 11/3495* (2013.01); *H04L 43/0876* (2013.01); *G06F 2009/4557* (2013.01); *G06F 2201/815* (2013.01)

(58) Field of Classification Search
  CPC ..... H04L 43/04; H04L 47/70; H04L 43/0876; G06F 9/4856; G06F 9/45558; G06F 11/3495; G06F 11/3433; G06F 2009/4557; G06F 2201/815
  See application file for complete search history.

(56) References Cited

U.S. PATENT DOCUMENTS

| | | | |
|---|---|---|---|
| 5,896,531 A | 4/1999 | Curtis | |
| 6,823,382 B2 * | 11/2004 | Stone | 709/224 |
| 6,968,535 B2 * | 11/2005 | Stelting et al. | 717/104 |
| 7,167,915 B2 | 1/2007 | Bendich | |

(Continued)

FOREIGN PATENT DOCUMENTS

| | | |
|---|---|---|
| CN | 1286426 A | 3/2001 |
| CN | 101419558 A | 4/2009 |

(Continued)

OTHER PUBLICATIONS

Karve, A., et al. "Dynamic placement for clustered web applications." Proceedings of the 15th international conference on World Wide Web. ACM, 2006.*
Guo, Chang Jie, et al. "A framework for native multi-tenancy application development and management." E-Commerce Technology and the 4th IEEE International Conference on Enterprise Computing, E-Commerce, and E-Services, 2007. CEC/EEE 2007. The 9th IEEE International Conference on. IEEE, 2007.*

(Continued)

*Primary Examiner* — Scott B Christensen
*Assistant Examiner* — Lam Do (57) ABSTRACT

Network utilization of an arbitrary application is controlled by tracking network usage statistics of virtual machines (VMs), including at least VMs hosting parts of the application. For network utilization control, VMs serve as network proxies for elements of the application. A specification for a network requirement of the application is evaluated against the network usage statistics. When a network capacity requirement to/from/through an element of the application is not satisfied, one or more VMs are adapted to satisfy the requirement. For example, a VM may be migrated from a host or network location that has excess network bandwidth. Or, for example, network bandwidth availability for an under-requirement VM may be increased and bandwidth availability for a VM at an appropriate host or network location may be decreased. Thus, application-level communication path requirements may be satisfied using VM adaptations.

18 Claims, 11 Drawing Sheets

(56) References Cited

U.S. PATENT DOCUMENTS

| | | | |
|---|---|---|---|
| 7,539,824 B2* | 5/2009 | Lolayekar et al. | 711/148 |
| 7,554,983 B1* | 6/2009 | Muppala | 370/392 |
| 7,644,162 B1* | 1/2010 | Zhu | H04L 41/145 709/226 |
| 7,702,779 B1 | 4/2010 | Gupta et al. | |
| 7,957,266 B2* | 6/2011 | Kodialam et al. | 370/216 |
| 8,214,829 B2* | 7/2012 | Neogi et al. | 718/1 |
| 8,224,971 B1* | 7/2012 | Miller et al. | 709/227 |
| 8,396,807 B1* | 3/2013 | Yemini et al. | 705/59 |
| 8,417,812 B1* | 4/2013 | Gulati | G06F 11/00 709/224 |
| 8,489,720 B1* | 7/2013 | Morford et al. | 709/223 |
| 8,606,897 B2* | 12/2013 | Ferris et al. | 709/223 |
| 8,694,400 B1* | 4/2014 | Certain et al. | 705/35 |
| 8,745,734 B1* | 6/2014 | Brandwine et al. | 726/22 |
| 9,036,504 B1* | 5/2015 | Miller | H04L 41/0816 370/254 |
| 2002/0032754 A1* | 3/2002 | Logston et al. | 709/219 |
| 2002/0069369 A1* | 6/2002 | Tremain | 713/201 |
| 2003/0088529 A1* | 5/2003 | Klinker | H04L 45/00 706/3 |
| 2003/0154236 A1* | 8/2003 | Dar | H04L 67/1025 709/201 |
| 2003/0193893 A1* | 10/2003 | Wen | H04L 12/5602 370/231 |
| 2004/0181589 A1* | 9/2004 | Suleiman | 709/213 |
| 2004/0255185 A1* | 12/2004 | Fujiyama | G06F 11/1482 714/4.1 |
| 2004/0267897 A1* | 12/2004 | Hill | G06F 9/505 709/217 |
| 2007/0118653 A1 | 5/2007 | Bindal | |
| 2008/0082977 A1 | 4/2008 | Araujo et al. | |
| 2008/0222632 A1* | 9/2008 | Ueno | G06F 11/3423 718/1 |
| 2009/0055507 A1* | 2/2009 | Oeda | G06F 9/4856 709/216 |
| 2009/0182874 A1 | 7/2009 | Morford | |
| 2009/0222558 A1* | 9/2009 | Xu | G06F 9/485 709/224 |
| 2009/0228629 A1* | 9/2009 | Gebhart | G06F 8/63 711/6 |
| 2009/0276771 A1* | 11/2009 | Nickolov et al. | 717/177 |
| 2009/0285222 A1* | 11/2009 | Hoover et al. | 370/397 |
| 2009/0292824 A1 | 11/2009 | Marashi | |
| 2010/0027420 A1* | 2/2010 | Smith | 370/235 |
| 2010/0036903 A1* | 2/2010 | Ahmad et al. | 709/202 |
| 2010/0050172 A1* | 2/2010 | Ferris | 718/1 |
| 2010/0091786 A1* | 4/2010 | Liu et al. | 370/419 |
| 2010/0281478 A1* | 11/2010 | Sauls et al. | 718/1 |
| 2010/0287263 A1* | 11/2010 | Liu et al. | 709/221 |
| 2010/0325485 A1* | 12/2010 | Kamath et al. | 714/15 |
| 2010/0332401 A1* | 12/2010 | Prahlad et al. | 705/80 |
| 2011/0060832 A1* | 3/2011 | Govil | G06F 9/5044 709/225 |
| 2011/0102190 A1* | 5/2011 | Vaidyanathan | H04Q 9/00 340/870.17 |
| 2011/0103389 A1* | 5/2011 | Kidambi et al. | 370/395.1 |
| 2011/0119381 A1* | 5/2011 | Glover et al. | 709/226 |
| 2011/0138384 A1* | 6/2011 | Bozek et al. | 718/1 |
| 2011/0149737 A1* | 6/2011 | Muthiah et al. | 370/235 |
| 2011/0276951 A1* | 11/2011 | Jain | 717/140 |
| 2012/0096473 A1* | 4/2012 | Durham | G06F 9/5077 718/105 |
| 2012/0106333 A1* | 5/2012 | Lee | H04L 67/1002 370/230 |
| 2012/0131176 A1* | 5/2012 | Ferris et al. | 709/224 |
| 2012/0173729 A1* | 7/2012 | Lee | G06F 9/5044 709/226 |
| 2012/0226800 A1* | 9/2012 | Baratakke | H04L 49/70 709/224 |
| 2012/0317249 A1* | 12/2012 | Salsburg et al. | 709/220 |
| 2013/0298184 A1* | 11/2013 | Ermagan | G06F 21/54 726/1 |

FOREIGN PATENT DOCUMENTS

| | | |
|---|---|---|
| CN | 101626598 A | 1/2010 |
| CN | 102082830 A | 6/2011 |
| JP | 2002016599 A | 1/2002 |
| JP | 2011503713 A | 1/2011 |

OTHER PUBLICATIONS

Liu, Bao Hua, Pradeep Ray, and Sanjay Jha. "Mapping distributed application SLA to network QoS parameters." Telecommunications, 2003. ICT 2003. 10th International Conference on. vol. 2. IEEE, 2003.*

Microsoft, "Tracert", https://web.archive.org/web/20090429193446/http://technet.microsoft.com/en-us/library/cc940128.aspx, Apr. 29, 2009.*

Ookla, "How does the test itself work? How is the result calculated?" https://support.speedtest.net/hc/en-us/articles/203845400-How-does-the-test-itself-work-How-is-the-result-calculated-, Jan. 13, 2012.*

Jones, Time, "Virtual Networking in Linux", http://www.ibm.com/developerworks/library/l-virtual-networking/, Oct. 27, 2010.*

Kuriakose, Mathew, Purushottam, Kulkarni, Varsha, Apte, "Network Bandwidth Configuration Tool for Xen Virtual Machines" Jan. 5, 2010, http://ieeexplore.ieee.org/stamp/stamp.jsp?arnumber=5431965.*

Legrand, "Monalisa: An agent based, dynamic service system to Monitor, control and optimize grid based applications" Publication Date 2007.

Reducing Bandwidth Utilization with Windows 7 and Windows Server 2008 R2 BranchCache Publication Date Jan. 2010.

"International Search Report", dated Nov. 29, 2012, Application No. PCT/US2012/039961, Filed Date: May 30, 2012, pp. 9.

"Search Report Issued in European Patent Application No. 12804593.7", dated Feb. 9, 2015, 6 Pages.

Kolyshkin, Kirill, "Virtualization in Linux", Published on: Sep. 1, 2006 Available at: http://web.archive.org/web/20070120205111/http://download.openvz.org/doc/openvz-intro.pdf.

Shrivastava, Vivek et al., "Application-Aware Virtual Machine Migration in Data Centers", In Proceedings of IEEE, INFOCOM, Apr. 10, 2011, 6 Pages.

Meng, Xiaoqiao et al., "Improving the Scalability of Data Center Networks with Traffic-Aware Virtual Machine Placement", In Proceedings of IEEE INFOCOM, Mar. 14, 2010, 10 Pages.

"Office Action Issued in Japanese Patent Application No. 2014-518571", dated Mar. 18, 2016, 10 Pages.

Mirkovic et al., DADL: Distributed Application Description Language, USC/ISI Technical Report # ISI-TR-664, (http://www.isi.edu/~mirkovic/publications/dadlsubmit.pdf), 2010, 6 pages.

First China Office Action for Application No. 201280032002.8, dated Apr. 1, 2016, 6 pages.

"Office Action Issued in European Patent Application No. 12804593.7", dated Jan. 16, 2017, 5 Pages.

"Second Office Action Issued in Chinese Patent Application No. 201280032002.8", dated Dec. 1, 2016, 14 Pages.

"Office Action Issued in Korean Patent Application No. 10-2013-7034651", Dated Feb. 9, 2018, 16 pages.

* cited by examiner

RELATED ART

FIG. 1

RELATED ART

FIG. 2 example distributed application

RELATED ART

FIG. 3

RELATED ART

```
<applicationA>
    <components>
        <component property1...>
            InternetGateway
        </component>
        <component property1...>
            Tier1App
        </component>
        <component property1...>
            Tier2App
        </component>
        <component>
            LoadBalancer
        </component>
        ...
    </components>
    <capacity specifications>
        <capacity specification>
            Min(Average(Tier1App), InternetGateway) = 1.5 MBS
        </capacity specification>
        <capacity specification>
            Sum(Connection(Tier1, Tier2)) > .5 MBS
        </capacity specification>
        <capacity specification>
            Each(Tier2, SQLDB) > .1 MBS
        </capacity specification>
        <capacity specification>
            Min(LoadBalancer, *) > .1 MBS
            Min(*, LoadBalancer) > .4 MBS
        </capacity specification>
    </capacity specifications>
...
</ApplicationA>
```

```
<P2P Application>
    <components>
        <component property1...>
            Gateway
        </component>
        <component property1...>
            Peer
        </component>
        <component property1...>
            Client
        </component>
        ...
    </components>
    <capacity specifications>
        <capacity specification>
            Avg(Peer, Peer) = .2 MBS
        </capacity specification>
        <capacity specification>
            Each(Peer, Gateway) > .1 MBS
        </capacity specification>
        <capacity specification>
            Avg(Client,Gateway,Peer)) < 0.05 MBS
        </capacity specification>
    </capacity specifications>
...
</P2P Application>
```

FIG. 11

CONTROLLING NETWORK UTILIZATION

BACKGROUND

In modern computing environments, distributed applications may consist of numerous autonomous units executing on different hosts, cooperating via a network, interfacing with clients such as browsers, accessing database servers, etc. Peer-to-peer applications, multi-tier web applications, distributed hash tables, server pools or clusters, are examples of distributed applications. Such distributed applications may execute in clouds, data centers, etc.

Network communication is necessary for effective operation of such applications. In some cases, it might be desirable for an application to have various network performance characteristics, for example, bandwidth between components, average throughput to the Internet or clients thereon, average bandwidth per application instance, etc. In other words, it may be desirable to have application-level network performance guarantees.

However, to date, such guarantees have not been possible. Network performance guarantees have been provided at the network level. Routers have been used to provide Quality of Service (QoS) guarantees, but these guarantees have not been oriented for distributed applications as a whole. In other words, the typical means for assuring bandwidth or capacity levels have been directed to data networks per se, rather than applications. Moreover, in an environment in which a distributed application may be executing, issues such as sharing of resources between different applications makes it difficult to guarantee network resources along communication pathways through a distributed application.

Even in cases where network resource provisioning might have been provided at the application level, the techniques used to obtain or maintain network resource requirements have involved techniques such as transmission rate control, throttling, and other network-oriented traffic control mechanisms. Although distributed application elements are often hosted in virtual machines (VMs), VM technology has not been exploited to help guarantee application-level network requirements.

Techniques related to controlling network resources for distributed applications using virtual machine (VM) technology are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Network utilization of an arbitrary application is controlled by tracking network usage statistics of virtual machines (VMs), including at least VMs hosting parts of the application. For network utilization control, VMs serve as network proxies for elements of the application. A specification for a network requirement of the application is evaluated against the network usage statistics. When a network capacity requirement to/from/through an element of the application is not satisfied, one or more VMs are adapted to satisfy the requirement. For example, a VM may be migrated from a host or network location that has excess network bandwidth. Or, for example, network bandwidth availability for an under-requirement VM may be increased and bandwidth availability for a VM at an appropriate host or network location may be decreased. Thus, application-level communication path requirements may be satisfied using VM adaptations.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview and Virtualization

Figure 1:
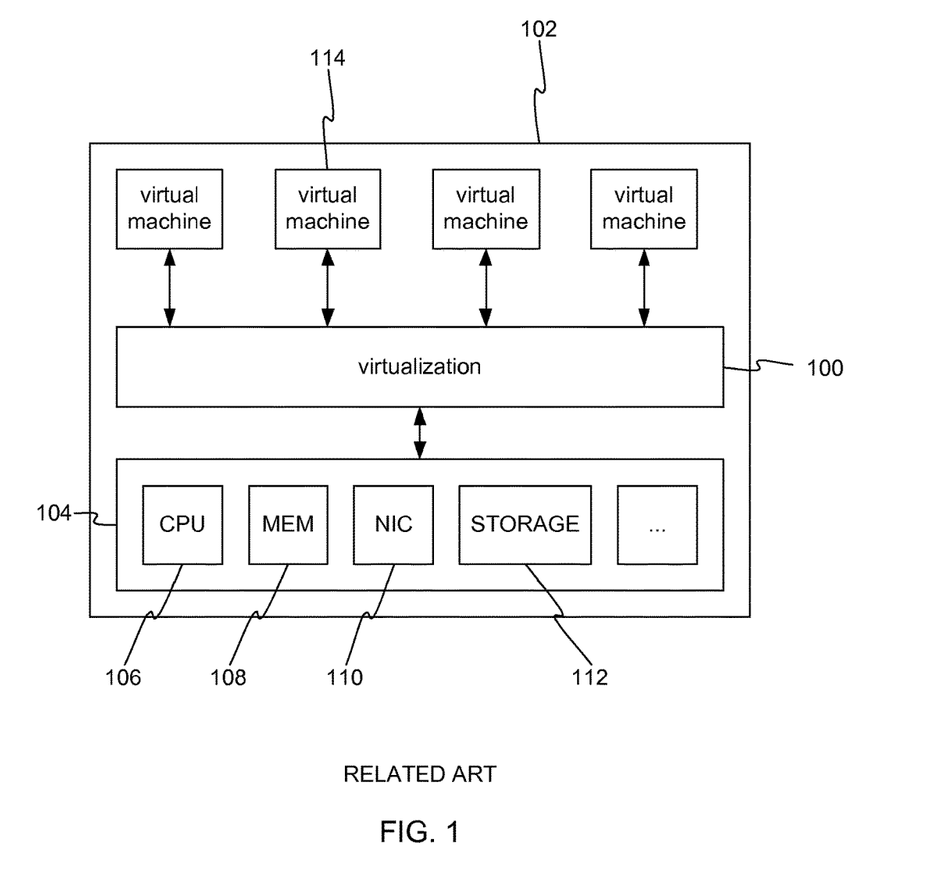
FIG. 1 shows an example virtualization layer.

Embodiments discussed below relate to using VM technology to provide network capacity in the presence of dynamic network conditions. Discussion will begin with an overview of virtualization technology including virtualization components such as hypervisors. Distributed applications and examples thereof will be discussed next. An overview of using VM technology for network provisioning will be described, followed by discussion of related VM enhancements and detailed explanation how those enhancements are used FIG. 1 shows an example virtualization layer 100. A computer 102 has hardware 104, including a central processing unit (CPU) 106, memory 108, a network interface 110, non-volatile storage 112, and other components not shown, such as a bus, a display adapter, etc. The virtualization layer 100 manages and facilitates execution of virtual machines 114. Although not shown in FIG. 1, each virtual machine 114 typically has an associated virtual disk image and a guest operating system. For brevity, the operating system and perhaps application software of a virtual machine 114 will sometimes be referred to as a guest, which is stored and executed from the virtual disk image associated with the virtual machine 114. For convenience, the term "hypervisor" will be used herein to refer to the various forms of virtualization layers. Moreover, as will be discussed below, virtual machines 114 are used to host elements of distributed applications.

The virtualization layer 100 may be of any variety of known or future implementations, such as Hyper-V Server™, VMWare ESX Server™, Xen, Oracle VM™, etc. The architecture of the virtualization layer may a hosted type, with a virtual machine monitor (VMM) running on a host operating system, or a bare-metal type with a hypervisor or the like running directly on the hardware 104 of the computer 102. As used herein, the term "virtual machine" refers to a system-type virtual machine that simulates any specific hardware architecture (e.g., x86) able to run native code for that hardware architecture; to the guest, the virtual machine may be nearly indistinguishable from a hardware machine. Virtual machines discussed herein are not abstract or process-type virtual machines such as Java Virtual Machines.

The virtualization layer 100 performs the basic function of managing the virtual machines 114 and sharing of the hardware 104 by both itself and the virtual machines 114. Any of a variety of techniques may be used to isolate the virtual machines 114 from the hardware 104. In one embodiment, the virtualization layer may provide different isolated environments (i.e., partitions or domains) which correspond to virtual machines 114. Some of the virtualization layer 100 such as shared virtual device drivers, inter virtual machine communication facilities, and virtual machine management APIs (application programming interfaces), may run in a special privileged partition or domain, allowing for a compact and efficient hypervisor. In other embodiments, functionality for virtual machine management and coherent sharing of the hardware 104 may reside in a monolithic on-the-metal hypervisor.

Figure 2:
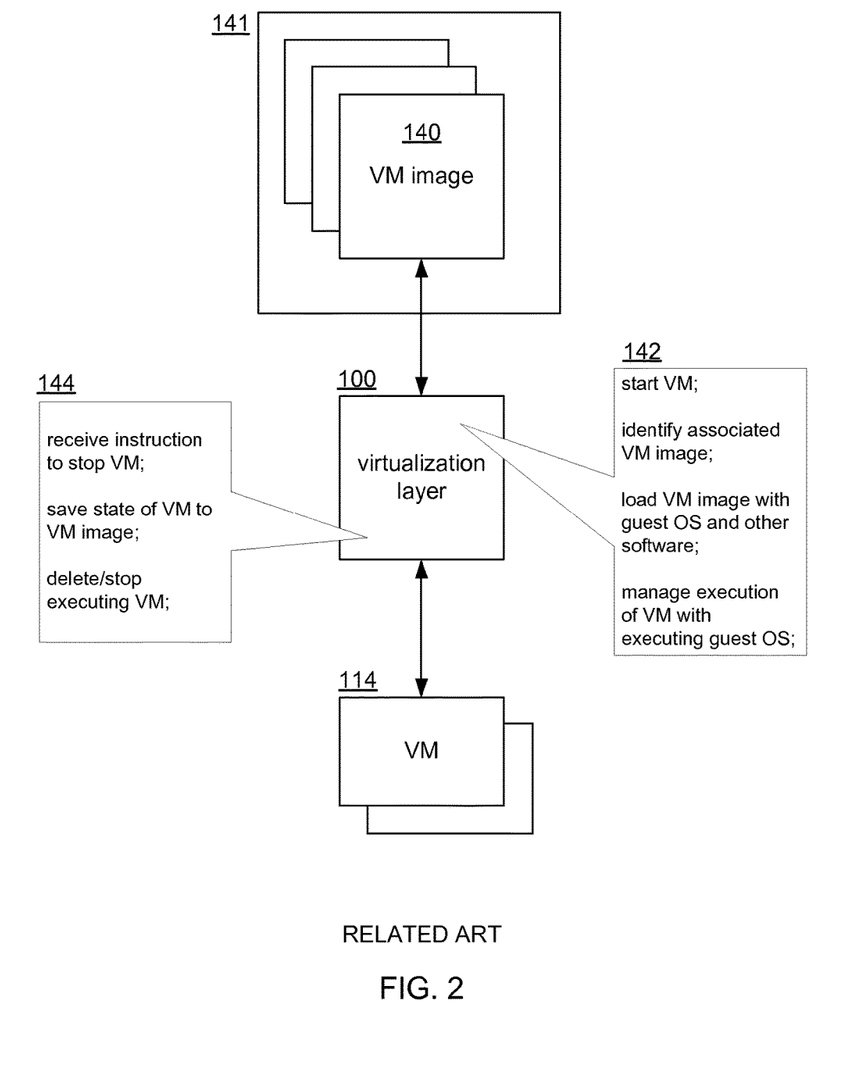
FIG. 2 shows processes and interactions of a virtualization layer in relation to virtual machines and virtual machine images.

FIG. 2 shows processes and interactions of virtualization layer 100 in relation to virtual machines 114 and virtual machine images 140. The virtualization layer 100 performs a process 142 of starting and executing a virtual machine 114, possibly according to corresponding virtual machine configuration parameters. When a virtual machine 114 (VM) is started, the virtualization layer identifies an associated virtual machine image 140. In practice, any virtual machine image 140 can be used by any virtual machine 114. The virtual machine image 140 may be a specially formatted file (e.g., a VHD) on a file system 141 of the virtualization layer 100. The virtualization layer 100 loads the identified virtual machine image 140. The started virtual machine 114 mounts and reads the virtual machine image 140, perhaps seeking a master boot record or other boot information, and boots a guest operating system which begins executing.

The virtualization layer 100 manages execution of the virtual machine 114, handling certain calls to the guest's kernel, hypercalls, etc., and coordinating the virtual machine 114's access to the underlying hardware 104. As the guest and its software run, the virtualization layer 100 may maintain state of the guest on the virtual disk image 140; when the guest, or an application run by the guest, writes data to "disk", the virtualization layer 100 translates the data to the format of the virtual disk image 140 and writes to the image.

The virtualization layer 100 may perform a process 144 for shutting down the virtual machine 114. When an instruction is received to stop the virtual machine 114, the state of the virtual machine 114 and its guest is saved to the virtual disk image 140, and the executing virtual machine 114 process (or partition) is deleted. A specification of the virtual machine 114 may remain for a later restart of the virtual machine 114.

Distributed Applications

Figure 3:
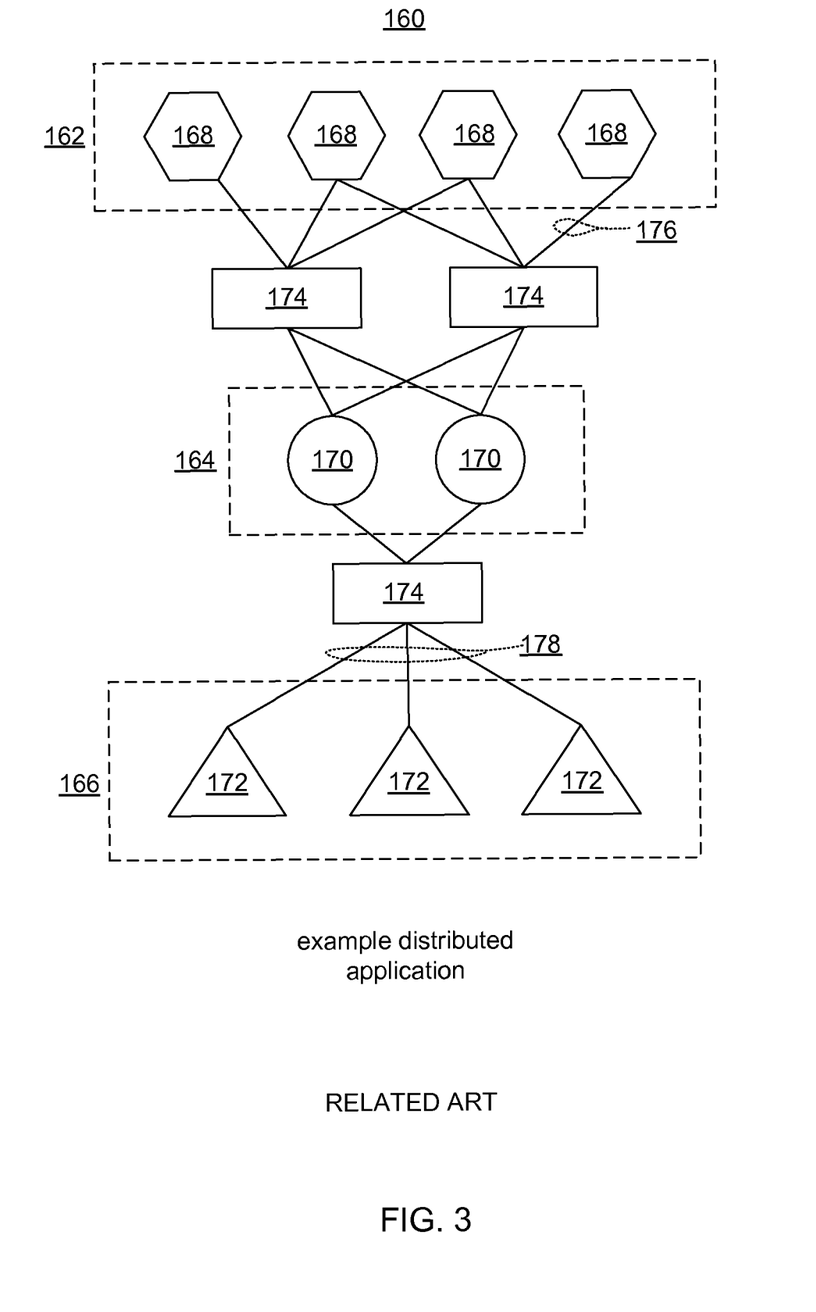
FIG. 3 shows an example of a distributed application.

FIG. 3 shows an example of a distributed application 160. The example in FIG. 3 is a multi-tier application having a presentation tier 162, an application-tier 164, and a data-tier 166. Although not shown, the distributed application executes in a data network in which elements communicate via communication nodes such as routers, bridges, switches, gateways, load balancers, etc. The presentation-tier 162 is comprised of web server instances 168 or other servers or applications that interface with clients that use the distributed application 160. Middle-tier 164 is formed by application instances 170 which may implement the main logic of the distributed application 160, translate between objects and data in a database, translate client requests to database queries, etc. Data-tier 164 may have a number of database servers 172, database interfaces, datastores, or other forms of persistent and efficient data storage. Load balancers 174 may balance load across the elements at each layer. The elements at each tier, for example the web servers instances 168, are duplicate executables or software stacks that have different execution states.

In operation, the distributed application 160 receives requests, for example from clients, other applications, services, etc. The requests are handled by the web server instances 168, which may initiate a transaction or otherwise communicate with the application instances 170. In turn, the application instances 170 may have interactions with the database servers 172.

Each solid line in FIG. 3 represents a possible path of network communication. With regard to network requirements of the distributed application 160, any of the solid lines (e.g., path 176), or any various sets of lines (e.g., path set 178) between like elements (e.g., all of the lines between web servers 168 and load balancers 174), or combinations thereof, are potential points where a network requirement might be specified, evaluated, and provisioned.

Figure 4:
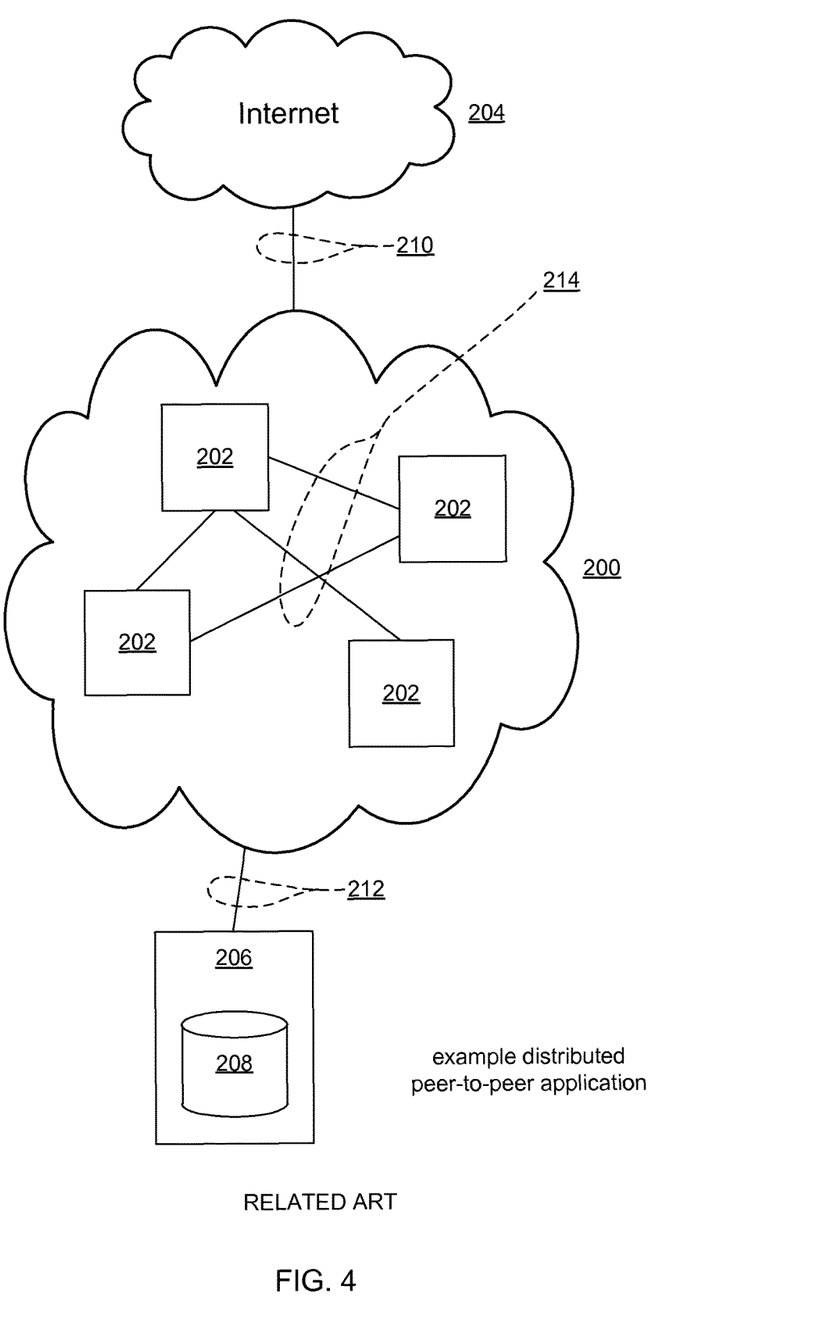
FIG. 4 shows another example distributed application.

FIG. 4 shows another example distributed application; peer-to-peer application 200. Peers 202 execute on different hosts (or, in different guests). Each peer 202 generally behaves the same and performs the same functions, though with differing operation states. The peer-to-peer application 200 might be a distributed hash table, a distributed storage system, a network service, etc. The peer-to-peer application may have connections between peers 202. The peers 202 may communicate with external entities via the Internet 204. The peers 202 might also use various services such as a database server 206 providing a relational database 208. Peers 202 may communicate for substantive servicing of external requests, as well as for internal maintenance of peer-level interconnectivity. An external request might be handled directly by a peer 202, or that peer might have information allowing it to pass the request to other peers 202 that service the request and return a response.

As in FIG. 3, solid lines represent network paths between elements. Lines between peers 202 represent inter-peer network paths, and lines to the peer-to-peer application 200 represent paths to any or multiple peers 202. As in FIG. 3, any of the lines (e.g., paths 210, 212) or sets of lines (e.g., paths 214) might be candidate targets for specifying a network capacity or bandwidth requirement, evaluating the requirement against measured conditions, and adjusting VMs to satisfy the requirement.

Application-Level Network Provisioning

Figure 5:
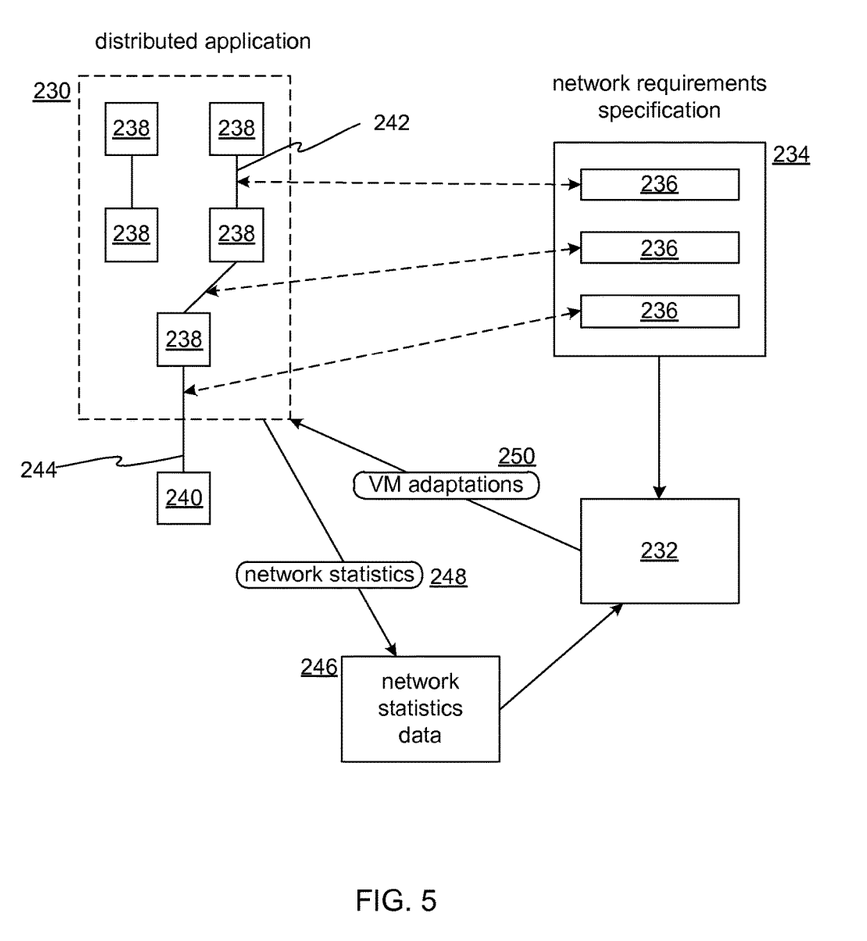
FIG. 5 shows a system for specifying network capacity for a distributed application and provisioning network capacity using virtual machine (VM) adaptations.

FIG. 5 shows a system for specifying network capacity for a distributed application 230 and provisioning network capacity using virtual machine (VM) adaptations. A network controller 232 performs processes, described later, for evaluating network conditions and needs of a distributed application 232. A network specification 234 is provided that specifies network requirements (or preferences) for the distributed application 230. The network specification 234 includes network requirements 236 for the distributed application 230.

A network requirement 236 may identify application-level network paths or connections between elements of the distributed application 230 (e.g., connectivity between elements without regard for underlying routers etc. that provide the connectivity). For instance, in the example of FIG. 3, a network requirement 236 might specify path 176 or path set 178. In the example of FIG. 4, a network requirement might identify paths 210, 212 or paths 214. Such paths or connections are identified, in the abstract, in terms of the application elements 238 of the distributed application and/or external elements 240 that connect with the distributed application 230 (application elements may be parts of the distributed application 230 that execute on different hosts or VM guests, such as peers 202, web servers 168, network services, etc.). In the example of FIG. 5, paths 242 and 244 have corresponding network requirements 236. A network requirement 236 also specifies a network resource requirement that corresponds to its path (or paths, or class of paths). For example, a network requirement 236 for path 242 might specify a specific (or dynamically calculated) bandwidth requirement such as 50 kilobytes per second (KBS). Details of network specifications are described later with reference to FIGS. 10 and 11.

FIG. 5 also shows network statistics data 246. The network statistics data 246 stores network statistics 248 reported from application elements 238 and/or network communication nodes (e.g., routers, aggregators, gateways, etc.). The network statistics might also include network topology information that network controller 232 uses to construct a model of the current topology of the underlying data network. Such topology information might be derived from collected BGP (border gateway protocol) routing data or OSPF (open shortest path first) routing data. Note that network topology information and a topology model are not required for network provisioning.

More specifically, the network statistics data 246 might include information about the current or historical network bandwidth consumed by application elements 238, hosts hosting same, VMs hosting application elements, and so on. In one embodiment, hypervisors managing VMs, in which application elements 238 execute, may have a component that monitors and reports network usage of individual VMs (see meter 270 in FIG. 6), possibly including information associating the usage (e.g., a bandwidth value) with an identity of the VM. In one embodiment, the network activity or consumption of each VM that hosts an element of the distributed application 230 is reported and tracked. In this case, the system keeps track of which VMs host which application elements 238. In effect the VMs act as network-tracking proxies of the application elements 238. Details and further examples of network statistics 248 and network statistics data 246 are discussed later.

Returning to FIG. 5, the network controller 232 evaluates the network statistics data 246 against the network requirements 236 of the distributed application 230. The network controller 232 may determine if some paths or sets or classes of paths (or combinations thereof) specified in the network requirements 236 are not (or will likely not be) satisfied. The network controller 232 in turn determines VM adaptations 250 that it issues to the host or hosts hosting the VMs in which the application elements 238 are executing.

A VM adaptation 250 might be instructions for one or more VM management components (see management component 274 in FIG. 6) to migrate a VM (or multiple VMs) from a first host to a second host by stopping the VM on the first host, transferring the VM's disk image to the second host (if necessary), and starting it on the second host. A VM adaptation 250 might be an instruction to a hypervisor to increase or decrease the network capacity for one or more of the VMs managed by the hypervisor. In one embodiment, hypervisors have logic (see regulator 272 in FIG. 6) to control network throughput for individual VMs. While throttling and migration are effective and straightforward techniques for controlling network usage, other techniques may be used. For example, in one embodiment, global bandwidth can be reduced by reducing the number of instances in an application tier. In another embodiment, guest operating systems are signaled to adjust network usage, for example, by spoofing a network saturation condition to a guest operating system's TCP (Transmission Control Protocol) rate control algorithm.

Regarding implementation of network controller 232, the network controller 232 might be implemented in a variety of computers. In one embodiment, the network controller 232 is included in a virtual machine management system that manages VMs across a network. For example, the System Center Virtual Machine Manager™, VMWare VirtualCenter™, etc. In another embodiment, the network controller 232 is a stand-alone application executing on any host with network connectivity. In yet another embodiment, the network controller 232 is itself a distributed application. The network controller 232 may be implemented as part of the distributed application 230 (with possible limitations on how bandwidth can be managed). In one embodiment, the network controller 232 manages many different distributed applications sharing a same network and hosts. In which case, it may have the ability to increase or decrease bandwidth available to one application to help meet a requirement of another application.

Figure 6:
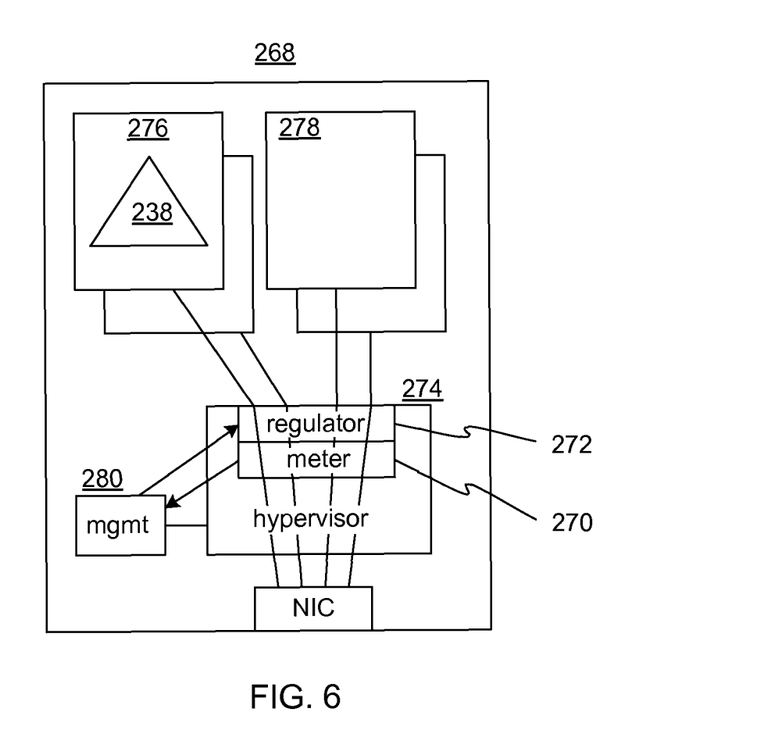
FIG. 6 shows an example of a host with virtualization enhancements to facilitate VM network reporting and network usage manipulation.

FIG. 6 shows an example of a host 268 with virtualization enhancements to facilitate VM network reporting and network usage manipulation. A hypervisor 274 performs known virtualization functions, as mentioned above, for executing VMs 276, 278. In addition, the hypervisor 274 has a regulator 272 and a meter 270. The meter 270 collects statistics about the volume (and/or rate) of network data transmitted to/from the VMs on the host 268. In one embodiment, the hypervisor may have a virtual NIC (network interface card) device for each VM and statistics are generated through the virtual NIC device.

The regulator 272 allows the hypervisor 274 to control network throughput of the VMs that it manages. A variety of control algorithms may be used. Known network rate control algorithms may be used (for example, by delaying queued packets before transmission). In some cases, bandwidth may be reduced for some VMs (for example, a VM 278 not part of the distributed application) to allow increase of bandwidth for a VM 276 hosting an application element 238. Note that the hypervisor or virtual NIC can inspect packets, as they pass through, to understand the corresponding actual network path and decide which network sessions to throttle.

The host 268 might also have a management component 280 to facilitate the network management. In one embodiment, the management component 280 collects statistics from the meter 270 and transmits the statistics for storage in the network statistics data 246. The management component 280 may also control the regulator 272 according to instructions from the network controller 232. The management component 280 may also carry out instructions to migrate VMs in response to VM adaptations from the network controller 232.

The management component 280 may also be a convenient means to allow the network controller 232 to interface with different virtualization implementations; different management component 280 implementations may be provided for respective virtualization implementations. Each may implement a same controller-facing API (application programming interface) and have different virtualization-facing logic suitable for a different virtualization implementation.

Functionality of the management component 280, regulator 272, and meter 270 may be included anywhere in the virtualization layer that is suitable for the particular virtualization implementation being used. Moreover, these components need not exist as actual discrete units; the corresponding functionality may be performed with a variety of designs.

Figure 7:
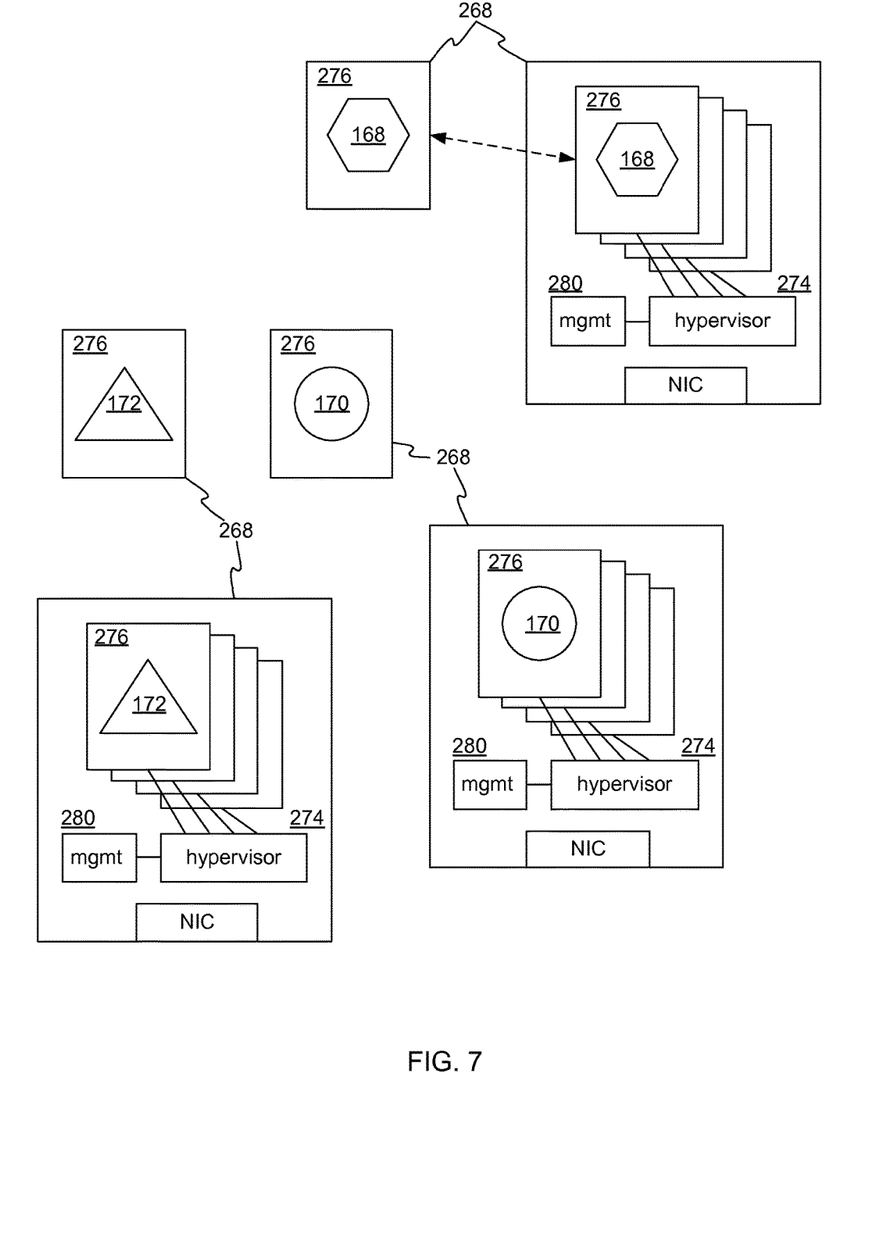
FIG. 7 shows the system of FIG. 5 in relation to the example distributed application in FIG. 3.
Figure 8:
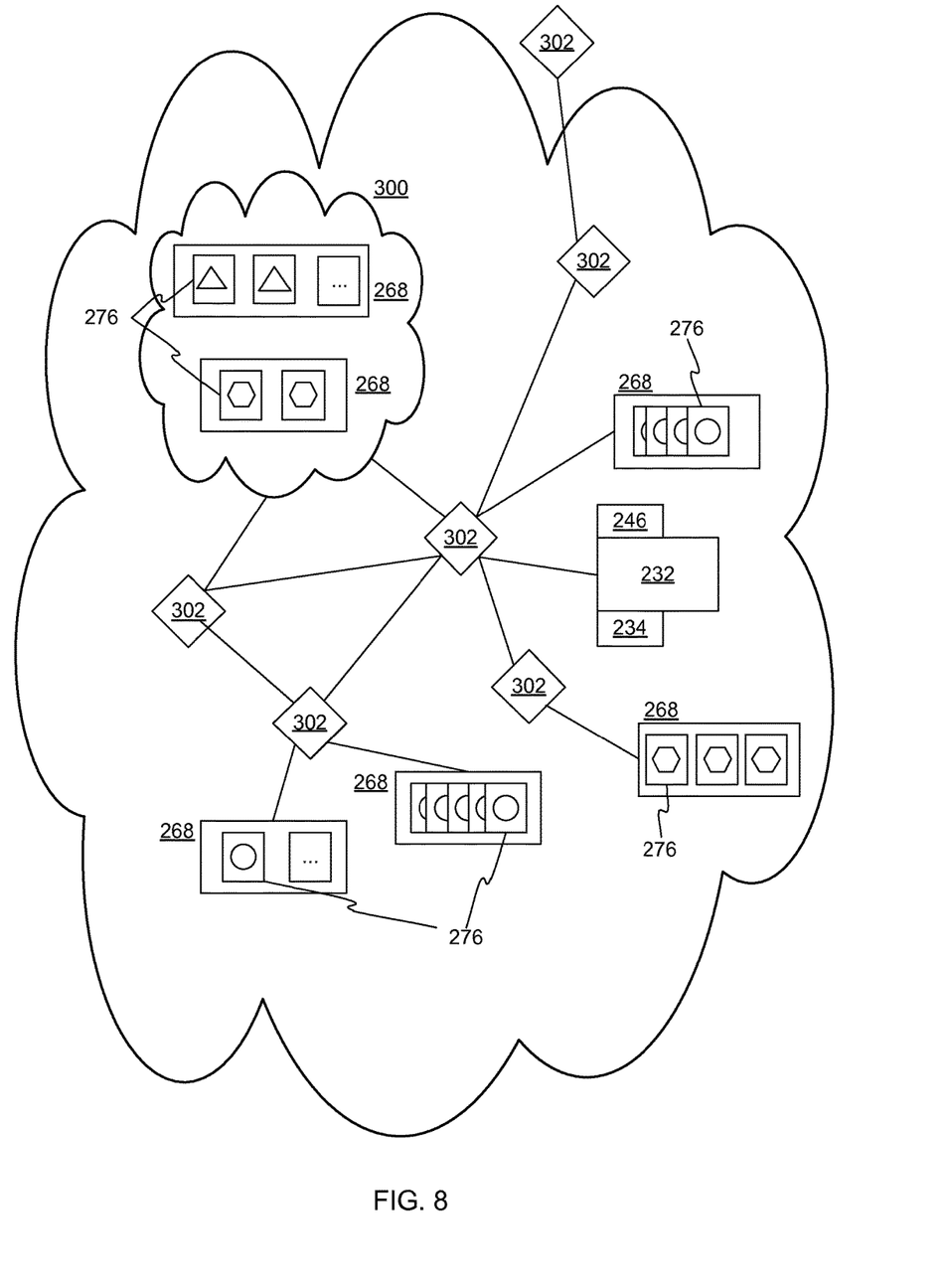
FIG. 8 shows hosts hosting a distributed application executing in VMs.

FIG. 7 shows the system of FIG. 5 in relation to the example distributed application 160 in FIG. 3. Hosts 268 have VMs 276 as described earlier, which may host application elements such as web servers 168, application instances 170, and database servers 172. Meters 270 and regulators 272 are assumed but not shown. Smaller versions of hosts 268 are the same as the larger versions of hosts 268. The larger versions illustrate the detail of the hosts 268 shown in FIG. 8. FIG. 8 shows hosts 268 hosting distributed application 160 executing in VMs 276. Some of the hosts reside in a sub-network 300, which may be a component of a specified path. The network controller 232 maintains information mapping the VMs 276 to application elements such as database servers 172, application instances 170, etc. Network statistics of the VMs 276 are accumulated in network statistics datastore 246. In one embodiment, network communication nodes 302 (e.g., routers, gateways, aggregators) provide network communications for the VMs 276.

Figure 9:
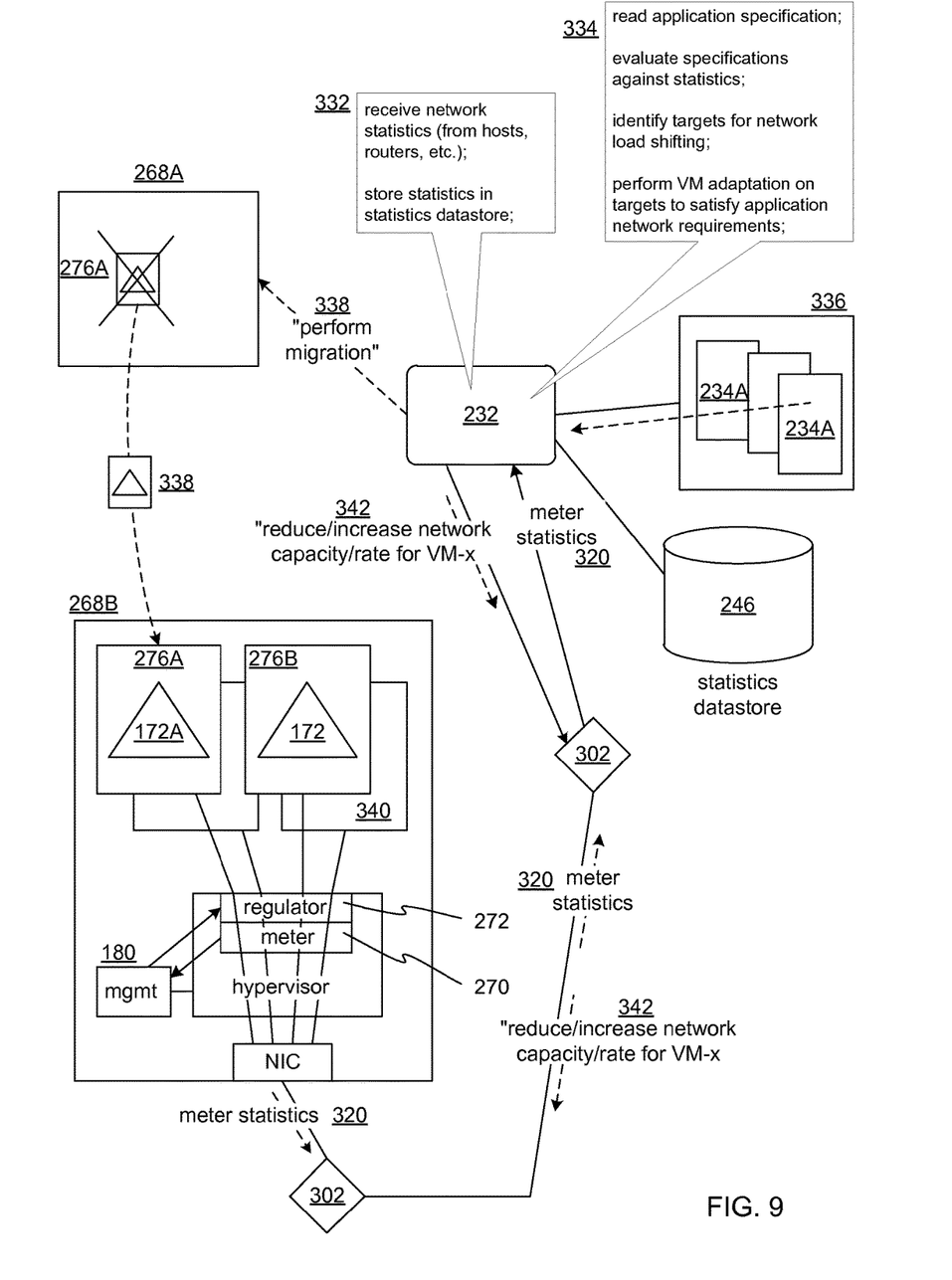
FIG. 9 shows a detailed view of a part of FIG. 8.

FIG. 9 shows a detailed view of an arbitrary part of FIG. 8. The meter 270 of host 268B accumulates VM 276 meter statistics 320 that are transmitted and stored in the network statistics data 246. Network communication nodes 302 may or may not also submit network statistics, for example link bandwidth rates, interface statics, etc. The network controller 332 may perform a process 334 for storing any network statistics, which may involve receiving statistics and storing them in the network statistics data 246.

The network controller 232 performs a process for shifting network traffic load within the network. The network controller 232 selects, from a collection 336 of network specifications a network specification 234A that corresponds to the distributed application. The specification is then repeatedly evaluated against the network statistics that relate to the distributed application. Whenever the network controller 232 determines that an adjustment is required so that actual conditions will comply with the requirements or preferences of the distributed application (according to network specification 234A), the network controller analyzes current or recent traffic statistics from the network to identify one or more targets for shifting network traffic load, possibly taking into account which VMs host which elements of the application. Accordingly, the network controller 232 performs VM adaptation on the targets.

Regarding VM adaptation, in one embodiment, the network controller 232, having identified VM 276A on host 268A as a target, transmits a "perform migration" instruction 338, which may identify the VM 172A, the source host 268A, and a destination host 268B. In response, the hosts 268A, 268B migrate VM 172A to host 268B. Techniques for VM migration are known and described elsewhere. Generally, VM 276A is stopped on host 268A, a disk image 338 of the stopped VM is transferred or made available to host 268B, and host 268B's virtualization components then restart VM 276A from the received/accessed disk image 338.

In a same or other embodiment, the network controller 232 may determine that network traffic is to be shifted by adjusting network capacity (e.g., lowering and raising various VM transmit rates) of target VMs. For example, the controller 232 may determine that a specified path requirement (e.g., a path including VM 276B) is not being satisfied. The network controller 232 may then identify one or more VMs at suitable host(s) (e.g., a VM 340 for another application, which often may be on a host other than host 268B) that currently can have bandwidth reduced, and then transmits instruction 342 to increase/decrease network rates or bandwidth allocations for the target VMs. The regulator 272 of the recipient host(s)—host 268B in this example—then responds by changing the allocations of the target VMs.

In yet another embodiment, the network controller infers the performance capability of network elements (e.g., routers) outside of the hosts by monitoring the latency of the transmissions under different loads. For instance, latency is a function of bandwidth, and if over time a latency/bandwidth curve is constructed, it is possible to use that curve (or other information correlating latency and bandwidth) to inform adjustments to VM placements. It is also possible to inject extra packets at a virtual NIC to probe the network performance. Such probe packets would be injected at the source and stripped at the destination.

It will be appreciated that either or both VM rate regulation and VM migration (or creation, deletion, or suspension) may be used. Network topology or statistics reported by network communication nodes 302 may or may not inform the network controller 232's decision making process. It will also be appreciated that the network specification and provisioning in effect occurs at the application level, as the specification specifies paths in terms of application elements, network statistics are reported for and correlated with those elements, and analysis and adjustment is performed with regard to the application elements. Thus, without necessarily reaching into the network level (and without the privilege required to do so), it is possible to attempt to guarantee rates/bandwidths for paths through (and possibly to/from) a distributed application. That said, in one embodiment the network controller 232 may also issue instructions to network communication nodes 302 as additional means for shifting network capacity to where it is needed. In some clouds or data centers, network bandwidth might have different costs at different times (e.g., time of day, day of week, etc.), and the system can be configured to adjust the network usage to meet global cost limits or a minimization function.

Figure 10:
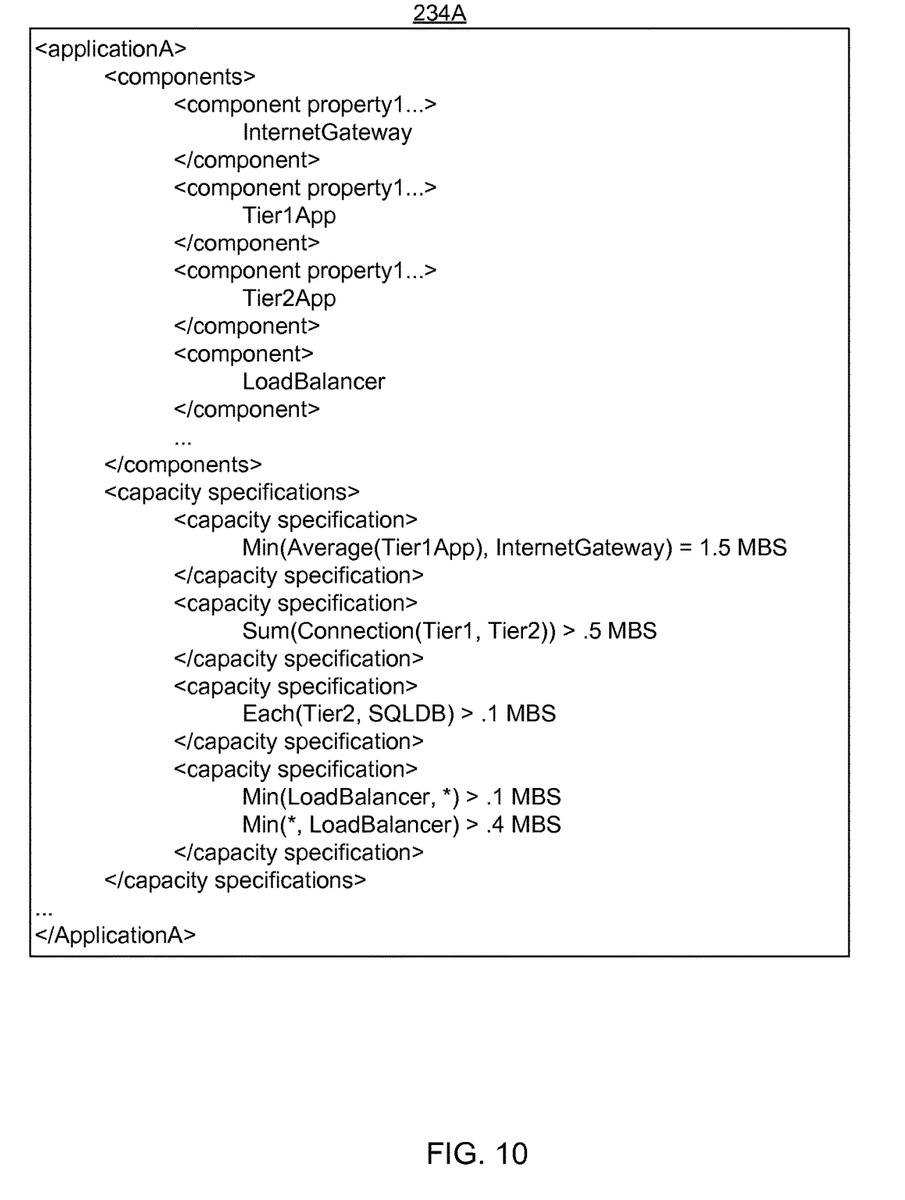
FIGS. 10 and 11 show example application network specifications.
Figure 11:
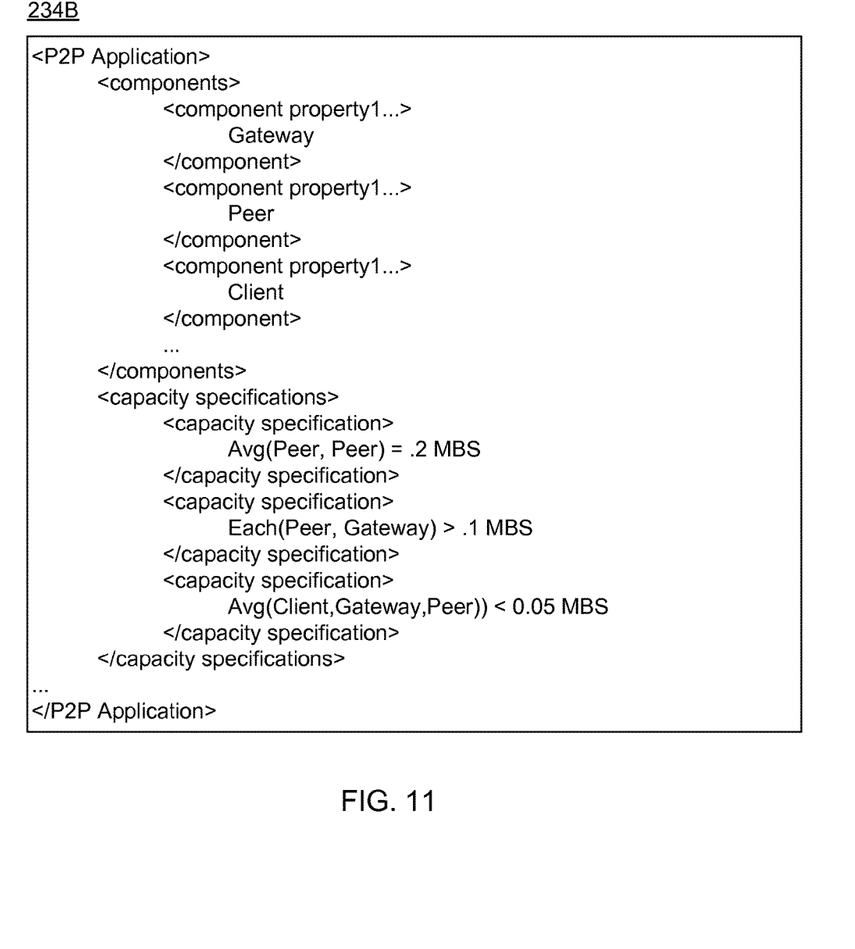

FIGS. 10 and 11 show example application network specifications 234A, 234B. The network specifications 234A, 234B may be written in XML (Extensible Markup Language). The XML elements in the examples are self-explanatory. Consider that the components or elements of the corresponding distributed application may be defined, for instance "Internet Gateway", "Tier1 App", etc. Capacity specifications for paths are then defined in terms of the components. For example, in network specification 234A, a capacity specification indicates that the average bandwidth of paths from Tier1 Apps (and by implication, their VMs) to the InternetGateway should be 1.5 MBS (megabytes per second). Another specification indicates that the sum of all Tier1-Tier2 paths must exceed 0.5 MBS. In one embodiment. A specification may be direction-sensitive; as indicated by the order of parameters in a specification statement.

The network specifications may define a rich expression language, allowing complex paths and conditions to be specified. Complex conditions may be specified. Corrective actions may also be specified. For example, a requirement may specify a first path condition and another path to be targeted to satisfy the condition. A requirement may specify multiple elements in a path. For example, a bandwidth from components A to B through component C.

CONCLUSION

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of specifying and allocating network bandwidth for distributed applications executing on virtual machines (VMs) executing on hosts in a network, the method comprising:
storing, by a computing device, application network specifications, each application network specification corresponding to a respective distributed application, each distributed application comprising a plurality of application elements executing on a respective plurality of the VMs on a respective plurality of the hosts, wherein an application network specification of a distributed application comprises individual bandwidth specifications of respective application elements of the distributed application, wherein each bandwidth specification (i) respectively identifies a first application element of the distributed application and a second application element of the distributed application element, and (ii) specifies an inter-element bandwidth condition as a function of a bandwidth requirement between the first application element and the second application element;
collecting, storing, and accessing measures of network usage in the network;
determining, by the computing device, for a given application network specification corresponding to a given distributed application, that an individual given bandwidth specification of the plurality of bandwidth specifications therein is not met, the individual bandwidth specification of the plurality of bandwidth specifications identifying a given first application element of the given network application, a given second application element of the given network application, and a given inter-element bandwidth condition in terms of the given first and second application elements, wherein whether the given bandwidth specification is met is determined by:
selecting, from among the measures of network usage, measures of network bandwidth for respective VMs, wherein the measures of network bandwidth are selected on the basis of the VMs being determined to be hosting instances of the first and second given application elements identified by the given bandwidth specification;
based on the network bandwidth specification, determining an inter-element bandwidth measure corresponding to bandwidth between one or more of the given first application elements and one or more of the given second application elements, wherein the inter-element bandwidth measure is determined using the selected measures of network bandwidth;
determining, by the computing device, that the given inter-element bandwidth condition is not met by evaluating the given inter-element bandwidth condition against the inter-element bandwidth measure; and
based on the determining that the given inter-element bandwidth condition of the individual bandwidth specification of the plurality of bandwidth specifications is not met, selecting one or more VMs on the basis of the selected VMs hosting the given first or second application elements, and migrating the selected one or more of the VMs and/or regulating, by one or more of the hypervisors, bandwidth usage of the selected one or more of the VMs.

2. A method according to claim 1, wherein the application network specification specifies a plurality of communication paths between application elements of the distributed application, and the method further comprises migrating a VM from a first host to a second host to satisfy a network requirement of one of the paths.

3. A method according to claim 1, wherein the measures of network usage include measures computed and provided by hypervisors on the hosts.

4. A method according to claim 3, wherein the measures of network usage include measures computed and reported by one or more routers, switches, or load balancers of the network.

5. A method according to claim 3, wherein at least some of the measures of network usage are obtained by hypervisors generating and inserting probe packets for transmission, receiving the probe packets, measuring a network statistic according to the probe packets, and stripping the probe packets so that they are not passed to a virtual machine.

6. A method according to claim 1, further comprising computing a bandwidth specification dynamically based on a cost minimization function, wherein, according to the cost minimization function, bandwidth cost varies as a function of time.

7. A method of distributing network usage among a plurality of hosts hosting virtual machines (VMs) communicating via a network, wherein each host has a hypervisor that manages the VMs executing thereon, the method performed by a computing device, the method comprising:
accessing network information stored by one or more computers, the network information comprising information specifying network requirements of respective distributed applications running on the VMs, where each distributed application comprises respective plurality of elements that execute on the VMs, and where a network requirement of a given distributed application specifies first and second of application elements of the given distributed application and specifies an intended network performance characteristic of the given distributed application, the network performance characteristic specifying an association between the first application element and the second application element, a statistical function of the association, and a bandwidth condition for the statistical function of the association;

accessing network performance data of the network;

based on the association in the network performance specification, obtaining, from among the performance data, measures of network performance between respective pairs of instances of the first and second application elements, based on the statistical function of the association in the network performance specification, computing the statistical function for the obtained measures of network performance to obtain a network performance statistic, and evaluating the network performance statistic against the bandwidth condition to determine that the network requirement is not satisfied; and based on the determination that the network requirement is not satisfied, attempting to satisfy the evaluated intended network performance characteristic by (i) migrating VMs among the hosts and/or by (ii) the hypervisors regulating network capacity available to the VMs that the hypervisors manage, wherein the VMs and/or the hypervisors are selected based on the network specification.

8. A method according to claim 7, wherein the network comprises routers, switches, and load balancers, and the guaranteeing further comprises increasing or decreasing network allocations at the routers, switches, or load balancers.

9. A method according to claim 8, further comprising building a model of performance characteristics of the routers, switches, and load balancers, and using the model for the increasing or decreasing of network allocations.

10. A method according to claim 7, further comprising guaranteeing a single bandwidth requirement between one or more of the first application elements instances and one or more of the second application instances.

11. A method according to claim 7, further comprising storing VM network usage statistics of individual VMs and using the VM network usage statistics to select one or more VMs to either be migrated or to have available network capacity increased or decreased.

12. A method according to claim 11, further comprising decreasing network capacity of a VM by suspending the VM.

13. One or more computer-readable storage devices storing information to enable one or more devices to execute a computing device comprising a network controller, the network controller, when executed, performing a process comprising:

accessing stored network statistics data comprising network usage statistics of individual VMs executing on hosts, the network statistics including individual statistics of respective VMs executing first instances of a first element of an application and second instances of a second element of the application;

accessing a network specification for the application, the application comprised of fluctuating numbers of the first and second instances executing on VMs executing on the hosts, the network specification comprising: a first identifier identifying the first element, a second identifier identifying the second element, an aggregation identifier comprising the first identifier and the second identifier, a bandwidth target, and a Boolean operator specifying a Boolean relationship between the aggregation identifier and the bandwidth target; and evaluating the network specification against the network statistics to, according to the network specification, identify one or more target VMs from among the VMs executing on the hosts, and initiating VM adaptations for the identified target VMs, the evaluating comprising:

based on the first and second identifiers in the aggregation identifier, obtaining from the network statistics measures of bandwidth between all of the first instances and all the second instances and computing an aggregation of the obtained measures, and based on the Boolean operator associating the aggregation identifier with the bandwidth target, determining that the computed aggregation and the bandwidth target do not satisfy the Boolean operator.

14. One or more computer-readable storage devices according to claim 13, wherein the VM adaptation comprises an instruction to migrate a VM.

15. One or more computer-readable storage apparatuses according to claim 13, wherein the VM adaptation comprises an instruction for a hypervisor to increase or decrease the network rate or bandwidth of one or more of the target VMs.

16. One or more computer-readable storage devices according to claim 13, wherein the network requirement specifies a statistical calculation for a class or group of the elements.

17. One or more computer-readable storage devices according to claim 13, wherein the network requirement specifies a communication path between an element and a network resource that communicates with the application.

18. One or more computer-readable storage devices according to claim 13, wherein the evaluating comprises identifying a particular VM according to the network specification, selecting a network statistic of the particular VM that was reported by a host hosting the VM, and comparing the network statistic against the network specification.

* * * * *